Patented Jan. 18, 1949

2,459,739

UNITED STATES PATENT OFFICE 2,459,739

ELASTOMERIC COPOLYMER MIXED WITH PHENOL-ALDEHYDE RESIN

Frank J. Groten, Montclair, and Robert J. Reid, Fair Lawn, N. J., assignors to The Firestone Tire and Rubber Company, Akron, Ohio, a corporation of Ohio No Drawing. Application April 1, 1944, Serial No. 529,170

2 Claims. (Cl. 260—43)

This invention relates to novel mutually plasticized compositions of elastomers in combination with thermosetting resins, and more particularly to such compositions in which the elastomers are copolymers of conjugated diolefins with acrylonitriles, and in which the thermosetting resins are of the phenolic type.

The elastomeric copolymers of the conjugated diolefins with the acrylonitriles constitute a well known and particularly excellent class of synthetic rubbers, especially in regard to their resistance to attack by solvents. Such elastomers, however, even more so than other synthetic rubbers, are exceedingly stiff, non-tacky, and non-plastic, and require the addition of plasticizing and tackifying agents to render them tractable in milling, compounding, molding, extruding, calendering, ply-building and like operations. Further, these elastomers must be plasticized in order to render the vulcanized products sufficiently flexible and resilient for use. Unfortunately, the usual types of plasticizing ingredients are incompatible, or only difficultly compatible, with these elastomers and fail to plasticize and tackify them to entire satisfaction. Moreover, employment of the usual plasticizers entails a greater or less sacrifice of one of the most important properties of these elastomers, viz., their resistance to solvents. The elastomeric copolymers of conjugated diolefins and acrylonitriles likewise have somewhat unfavorable mechanical properties. Particularly, they have low tensile and tear strengths, which must be enhanced in order to render the elastomers technically useful.

The phenolic resins are the oldest, cheapest and most familiar of all synthetic plastic materials. These resins are quite hard and brittle, and have not heretofore been plasticized to any substantial degree. Accordingly, the phenolic resins, despite their cheapness, have been limited to the fabrication of rigid objects requiring no high degree of flexibility or shock resistance.

It is therefore an object of this invention to plasticize the elastomeric copolymers of conjugated diolefins with acrylonitriles to the degree necessary for working, compounding and fabricating the same.

Another object is to develop a degree of tack in these elastomers suitable for plying, building and like operations.

Another object is to develop a suitable degree of softness and pliability in cured products made from such elastomers.

Another object is to plasticize such elastomers without rendering the articles fabricated therefrom subject to attack by solvents.

A further object is to increase the tensile strength and tear resistance of these elastomers.

A still further object is to plasticize, and render flexible and/or shock resistant, the phenolic resins.

The elastomeric copolymers of the conjugated diolefins with the acrylonitriles are not generally regarded as being extensively compatible with the phenolic resins. It has been discovered by this invention, however, that stable compounds may be prepared by milling the phenolic resins and commercially prepared elastomers together at temperatures above 80° C. Likewise, in the special case where an elastomer manufactured under special, at present non-commercial conditions, is employed, stable compounds may be made by dissolving the several components in an appropriate mutual solvent, or by milling the components without supplemental heat. In general, products containing from about 10% to about 900% of phenolic resin, based on the weight of the elastomer used, have properties significantly and advantageously different from the several components thereof. The compounds of this invention are effectively plasticized, being softer than either the elastomers or phenolic resins alone, and are amenable to any milling, compounding, molding, extruding, frictioning or ply-building operations which it may be necessary to conduct thereon. The compounds likewise have an excellent tack for building, plying and like operations. The compounds may be heat-treated, with or without addition of curing agents, to cure the elastomer and/or thermosetting resin and to yield products varying in properties from strong, resilient, elastic, admirably flexibilized rubbery products in the case of compounds having low phenolic resin content; through flexible but non-resilient compounds of intermediate phenolic resin content; to hard, but plasticized and shock-resistant products of high phenolic resin content. The compounds may likewise be dissolved in various solvents to yield cements which may be used as adhesives, as impregnating and coating agents, and for the production of films and dipped goods.

Referring to the elastomers forming one principal component of the compounds of this invention, these may be any copolymers of any conjugated diolefins having the formula:

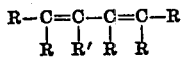

with any acrylonitriles having the formula:

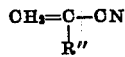

in which formulae:

R in each occurrence, and independently of its other occurrences, represents hydrogen or a methyl radical;

R' represents hydrogen, a methyl group, or a chlorine atom;

R'' represents hydrogen, or a methyl, ethyl, propyl or chloro radical.

The acrylonitrile-content of the elastomer may vary from 10% to 75%. Suitable copolymers may be prepared in accordance with any of the usual polymerization procedures, for instance by emulsion polymerization of a mixture of a suitable diolefin with a suitable acrylonitrile in the presence or absence of modifying agents, etc., as will appear more particularly hereinafter. Conjugated diolefins suitable as one component of the elastomers employed in the practice of this invention are exemplified in butadiene; isoprene; 1-methyl-1,3-butadiene; 2,3 - dimethyl-1,3-butadiene; and 2-chloro-1,3-butadiene. Suitable acrylonitriles are acrylonitrile; methyl acrylonitrile; ethyl acrylonitrile; propyl acrylonitrile; and chloro acrylonitrile.

The manufacturing history of any elastomer will greatly affect its behavior in the compositions of this invention. One principal variation in the usual processes of copolymerizing diolefins with acrylonitriles consists in the use of "modifying" or regulating agents during polymerization, examples of this practice being shown in the patent to Wollthan 2,281,613. These agents appear to inhibit cross-bridging of the elastomer chains, and also seem to result in products of somewhat lower molecular weight. The same general effect can be secured by limiting the extent to which the polymerization is carried out. These are well known techniques in the manufacture of elastomers of this general type, and elastomers produced by limiting the extent of polymerization and/or the use of modifying agents will hereinafter be designated as "modified." Modified elastomers tend to be more plastic in nature and require less phenolic resin to develop a given degree of plasticity than do the unmodified elastomers. Modified elastomers are more readily compatible with the phenolic resins than unmodified elastomers and do not require such elevated temperatures to effect compounding, resembling freshly prepared elastomers in this respect, as will be brought out more fully hereinafter.

Likewise, elastomers of the type employed in this invention are greatly affected by the mode of drying of the polymers after they have been coagulated and separated from the emulsion in which they were polymerized. Commercially, these elastomers are dried by means of hot air in ovens, which treatment appears to result in a continued polymerization thereof, and in a less ready compatibility thereof with the phenolic resins. Likewise such oven-dried elastomers tend to have less cold-resistance than elastomers which have not been subjected to oven drying. Accordingly the use of oven drying is to be avoided if possible. One excellent technique to this end involves the omission of the air-drying step altogether, the wet curd being simply milled with the other ingredients. The milling extrudes a large portion of the water, and the remainder is evaporated.

A third important variable in the history of any elastomer to be used in this invention is its age. In general, freshly-prepared elastomers are more readily compatible with the phenolic resins, and yield superior products, particularly in regard to cold resistance, as compared to aged elastomers. Also it is possible to dissolve the freshly prepared elastomers along with the phenolic resins in suitable solvents, without preliminary milling of the ingredients. Solutions prepared from the usual aged elastomers and phenolic resins, without preliminary hot milling together of the ingredients, tend to separate into two layers, an elastomer-containing layer and a phenolic-resin containing layer.

The foregoing manufacturing variables—degree of polymerization, use of modifying agents, mode of drying, and age—have more or less concurrent influence upon the compatibility, ease of compounding, temperature of compounding, and cold resistance of the final products in the practice of this invention. Modification, omission of oven-drying, and freshness of elastomer, or any combination or degree of these factors, will lower the temperature at which the elastomer may be incorporated with the phenolic resin and also tend to make the finished products more cold-resistant. In some cases, particularly when the elastomer is more or less fresh, these devices make possible the direct compounding of the ingredients in solution or upon the mill without the use of supplementary heat. The several factors may more or less substitute for one another. For instance, an elastomer of a given age may be just barely compatible with a given phenolic resin without the use of heat. A somewhat older elastomer would similarly be compatible, provided a greater degree of modification was involved in the preparation thereof, or if the oven drying thereof was omitted.

It has recently become known that butadiene-acrylonitrile elastomers, similarly to natural rubber, consist of "sol" and "gel," fractions; and the factors which have been observed to favor the predominance of the "sol" fraction in butadiene-acrylonitrile elastomers, are the same factors which are noted above as resulting in more ready compounding, enhanced cold resistance, etc. in the process and product of this invention. It may therefore be stated that a high "sol" content in a given elastomer is a sufficient (although perhaps not necessary) condition for such ready compounding and enhanced cold resistance.

The phenolic resins employed as the other principal constituents of the compounds of this invention may be any of the well known class of phenolic resins produced by condensing any phenolic compound with any aldehydic compound, generally in the ratio of about ¾ to about 3 mols of aldehydic constituent for each mol of phenolic compound. Exemplary phenols suitable for this purpose are phenol itself; the ortho, para and meta cresols; the xylenols; the dihydroxy benzenes, such as resorcinol; the polynuclear phenols such as the naphthols; and the various alkylated aralkylated, carboxylated, alkylolated, etc. derivatives of phenols of these types, such as o-ethyl phenol, carvacrol, salicylic acid and the like. Suitable aldehydes are exemplified in formaldehyde, acetaldehyde, propionaldehyde, benzaldehyde and the like. The resins may also be of the "modified" types produced by the addition of oils, alkyd resins, etc. during the condensation. The preferred resins are those of the type formed by the combination of an aldehyde with phenol itself, or with one or more of the cresols, or with a mixture of phenol with one or more cresols, as these resins do not inhibit, and in most cases actually favor, the heat-curing of the compound of this invention.

As is well known, the phenolic resins are usually synthesized in the presence of catalysts, which essentially consist either of hydrogen ion yielding (acidic) or of hydroxyl ion yielding (basic) substances. In general, the acid-condensed resins are preferred ingredients for the development of the highest possible tensile strength and tear resistance in the cured products of this invention. Such acid-condensed resins are usually neutralized, upon the conclusion of the condensation reaction, with a basic substance, usually hexamethylene tetramine. The hexamethylene tetramine, besides neutralizing the resin, also serves as a curing agent which must always be supplied at some stage when acid-condensed phenolic resins are to be cured. When hexamethylene tetramine is to be used in connection with the resin in compositions according to this invention, the resin is preferably heat-treated before the resin is compounded with the elastomer. If such heat-treatment is not carried out, or if the addition of the hexamethylene tetramine is delayed until after the addition of the elastomer, it reacts unfavorably upon the elastomer. The base-condensed resins are preferred where resistance to heat-deterioration is the primary consideration. It is understood, of course, that both general types of phenolic resins develop excellent working properties in the uncured compositions, and outstanding tensile strength, tear resistance and other mechanical properties in the final cured product.

As is well known, the phenolic resins condense in several stages, forming first a soluble resin, which passes successively to an insoluble but fusible resin and then to a final insoluble and infusible resin. It is to be understood that the condensation of the phenolic resins for use in this invention must not be carried beyond the fusible stage, as otherwise the materials cannot be incorporated with the elastomers.

Referring to the incorporation of the phenolic resins with the ordinary commercially prepared elastomers, as noted above these materials cannot be blended together by ordinary methods. However it has been discovered by this invention that these materials may be incorporated together by any suitable milling operation conducted at least in part at temperatures upwards of about 80° C. and below the temperatures at which curing or thermosetting of the selected elastomers and/or phenolic resins will occur during the time the materials are held at this elevated temperature. Thus, for instance, the selected elastomer may be initially broken down on a cold roll mill, and the selected phenolic resin is then introduced into the working bank of the elastomer on the mill to form an even mixture, but no true fused compound, with the elastomer. The mill is then heated up to 80° C. or above, whereupon the resin becomes smoothly and stably incorporated into the elastomer. The resultant compound will be plasticized to a degree suitable for compounding additional ingredients thereinto, and for any molding, extruding, calendering, ply-building or other operations which it may be desired to conduct upon the uncured material. It is to be understood that the milling operation may be carried out upon types of mills other than roll mills, such as Baker-Perkins mixers, Banbury mixers and the like, provided, of course, that heat be supplied at some time during the milling to fuse the ingredients together.

As noted above, the hot-milling process is unnecessary, or can be carried out at lower temperatures, for the production of the compounds of this invention from high "sol"-content elastomers which have been specially prepared by the exercise of a sufficient degree of modification and/or omission of a hot air drying and/or avoidance of aging and/or other special techniques. Such special precautions are of course never observed in commercial practice and the ordinary commercial elastomers could not be used in this special manner. Thus a modified, freshly-prepared elastomer may be milled with a phenolic resin, without addition of any heat other than that developed by milling, to yield homogeneous true compounds. Likewise these ingredients can be dissolved in suitable solvents by the use of high speed agitation to produce smooth, stable cements. By way of contrast to this behavior, a solution made, without preliminary milling together of the ingredients, from a phenolic resin and an ordinary commercial elastomer, will invariably separate into two phases.

Relating in general to solutions of the compounds of this invention, although such solutions cannot be directly prepared from unmilled commercial elastomers, nevertheless stable solutions may be made from any of the compounds prepared by the applicants' hot milling process. This is an interesting circumstance, indicating the probable occurrence of some chemical or colloidal transformation and interaction between the elastomer and phenolic resin during hot-milling. Suitable solvents for the formation of solutions of the compounds of this invention may be any of the solvents or mixtures of solvents in which the components are both individually separately soluble, such as methyl ethyl ketone, dioxane, the Cellosolves, benzene and the like. These solutions assume the form of smooth liquid cements which may be used as hereinafter more fully detailed.

The amounts of phenolic resins entering into the compositions of this invention, as noted above, will in practice vary from about 10% to about 900%, based on the weight of the elastomer. In accordance with the usual practice in rubber technology, all percentages given hereinafter will be on the basis of the weight of elastomer in any given compound. Compositions within this range are significantly more plastic, both in uncured and cured states, than their isolated constituents. Likewise the uncured compositions have an excellent tack. Within this range, however, the compositions vary greatly in properties. Relating first to the uncured compounds, those containing in the range 10-30% phenolic resin will be more or less rubber-like in properties, but definitely more plastic than the undiluted elastomers. In fact, it is possible, in some cases, to plasticize the elastomer to a degree permitting it to be transfer molded—a result apparently never obtained hitherto with any elastomer whatsoever. The uncured blends containing greater proportions of phenolic resins will be progressively harder and tougher, and those containing above about 200% are capable of being ground to yield molding powders which may be mixed with fillers, etc. and molded. All of the uncured blends will, of course, be sufficiently compatible, tenacious, plastic and tacky to be worked and compounded on the mill, and fabricated into any desired objects.

While it is believed that the uncured compositions of this invention will most frequently constitute intermediate products in the manufacture of cured articles, nevertheless the uncured compositions have many properties adapting them for direct use. Thus, they may be used for crepe-type shoe soles, simulated leathers, fabric coatings, wrapping films, and the like.

Coming to the cured compounds, these will vary progressively, with increasing phenolic resin content, from plasticized rubbery products to hard, tough, inflexible but shock-resistant solid materials. Those containing from about 10% to about 30% of phenolic resin are rubbery in nature; those containing from about 30% to about 50% phenolic resin are progressively less rubbery and more in the nature of flexible, boardy materials; those containing more than 50% and up to about 900% tend to be hard, inflexible, but shock-proof masses. It is understood that the cited figures are approximate only, since variations in the composition and history of the selected elastomer and of the selected phenolic resin will vary the properties of the final product. Accordingly, the exact formulation of any compound for any specific application is best determined by preliminary experimentation with the selected elastomer and the selected phenolic resin, bearing in mind, of course, the general principles above set forth.

The fabrication and curing of the uncured compositions of this invention can be carried out in accordance with any of the techniques usual in the rubber and plastics arts. Thus, the plasticized masses may be extruded smoothly by conventional equipment, may be molded, and will flow readily, in ordinary compression molds; may be calendered out into smooth sheets; and may be friction calendered as coatings onto fabrics. As noted above, it is possible, in the practice of this invention, to soften the elastomer to a degree permitting it to be transfer molded, which is apparently an entirely novel practice with elastomeric materials. Further the masses may have blowing agents incorporated therein to produce expanded sponge or pore-sealed products. The masses may be assembled by plying and building methods, and are admirably adapted for such operations by reason of their flexibility and tack. Particularly, the coated fabrics can be plied up into laminates of excellent properties. Likewise the solutions or cements of the compositions of this invention may be used for a wide variety of purposes, for instance as adhesives for fabric, wood, paper, rubber, plastics, metal and the like. Further, the cements may be used to impregnate and coat textiles, paper and like materials, which coated materials may be used either as such or in cured form as liquid-and-gas-proof membranes and sheetings. Likewise the impregnated materials may be built, plied or laminated with or without heat and/or pressure to yield composite articles of great merit. These articles may be cured or not as desired, either during the assembly or subsequently.

Another mode of fabrication of the compositions of this invention, applicable chiefly to the high-phenolic-resin-content compositions, resides in pulverizing or otherwise comminuting the compositions. The pulverized compositions may be handled as molding powders in the conventional art of molding thermosetting materials, as by compounding with fillers, pigments, colors, dyes, curing agents and the like, stamping into preforms, hot molding, etc.

The articles fabricated from the compositions of this invention may be cured by heating them to curing temperatures, either concurrently with the fabrication process, as in hot molding and hot-laminating, or subsequently in autoclaves, open steam cure chambers, ovens and the like. The cure may be assisted by the presence of conventional accelerating and curing agents for the elastomer and/or the phenolic resin, these agents preferably being added just prior to, or at least during, the hot milling, to avoid the possibility of premature curing. However, the use of curing agents is not strictly necessary, as the phenolic resin and elastomer seem to exert a mutual curing effect. Likewise it appears to be possible in some cases by careful adjustment of curing temperatures and/or selection of curing agents, to selectively cure either the elastomer or the phenolic resin, without curing the other of the two constituents; however, in most cases conditions will be so chosen as to effect simultaneous curing of all constituents of the blend.

The compositions of this invention may further have incorporated thereinto other compatible thermoplastic and thermosetting resins. Thus, for instance, greater or less proportions of polyvinyl chlorides, polyvinyl acetates and polyvinyl chloride-acetates may be added to the compositions of this invention and will result in very useful products. Likewise the compositions may contain other thermosetting resins such as urea-formaldehyde, melamine-formaldehyde, and like resins. Further, the compositions may contain any of the usual plasticizers, fillers, reinforcing agents, pigments, anti-oxidants, stabilizers and the like.

The compositions of this invention, particularly the cured compositions, are suitable for a wide variety of purposes. The high-elastomer-content compounds are suitable for any of the usual applications of rubber, such as vehicle tires, flexible hose, belting and the like; on account of their solvent resistance, they are particularly suited for the manufacture of flexible fuel hose and fuel cell fittings. They may be calendered or otherwise coated or impregnated onto, and adhere well to, textiles, to yield water-and-gasproof fabrics suitable for waterproof apparel, flotation gear and the like. The coated or impregnated fabrics may also be plied up into laminates. The medium-elastomer-content compounds are suitable for control linkage boots, shoe soles, simulated leathers, semi-rigid structural panels for luggage and fuel cells, and the like. The hard, high-phenolic-content compounds may be used in any of the applications where hard plastics are ordinarily used, and have the advantage, in these last applications, of greatly enhanced shock-resistance.

With the foregoing general discussion in mind, there are given herewith specific examples of the practice of this invention. All parts given are by weight.

qualitative behavoirs of the several strips on bending were also recorded and are set forth in Table I.

Table I

| Type of Phenolic Resin Used | | Amount of Phenolic Resin used (parts per 100 parts elastomer) | Properties of Cured Compound | |
|---|---|---|---|---|
| Phenol Content | Condensation Conditions | | Break | Qualitative Properties |
| 40 per cent | sodium hydroxide catalysed | 25 | no break | very flexible. |
| 40 per cent | do | 50 | do | flexible, very tough. |
| 40 per cent | do | 75 | tear | fairly flexible. |
| 82 per cent[1] | acid catalysed | 50 | bend break | stiff. |
| 82 per cent[1] | do | 75 | do | Do. |
| 40 per cent | ammonia catalysed | 50 | tear | flexible. |
| 40 per cent | do | 75 | do | stiff. |
| 82 per cent | acid catalysed, neutralized with calcium oxide | 25 | hammer break | flexible. |
| 82 per cent | do | 50 | do | stiff. |
| 82 per cent | do | 75 | bend break | Do. |
| 82 per cent | acid catalysed, neutralized with sodium carbonate | 25 | no break | fairly flexible. |
| 82 per cent | do | 50 | bend break | stiff. |
| 82 per cent | do | 75 | do | Do. |
| 82 per cent[2] | acid catalysed, neutralized with hexamethylene tetramine | 25 | no break | Do. |
| 82 per cent[2] | do | 50 | do | stiff, very tough. |
| 82 per cent[2] | do | 75 | hammer break | very stiff. |
| 82 per cent[2] | do | 100 | bend break | extremely stiff, but flexible. |
| 82 per cent[2] | do | 200 | do | hard, shock-resistant. |
| 82 per cent[2] | do | 900 | do | Do. |

[1] Phenol used contained 50% cresols.
[2] Resin was neutralized by melting with hexamethylene tetramine, cooling, and pulverizing the neutralized resin.

EXAMPLE I

A "modified" elastomeric copolymer of butadiene with acrylonitrile, having an acrylonitrile content of 40%, was used in this example. This elastomer was made up into a number of separate compounds with various proportions of various different types of phenol-formaldehyde resins. Each compound was prepared, cured and tested in accordance with the following procedures.

A. COMPOUNDING

The elastomer was broken down for 10 minutes on a cold, tight-set mill. Thereafter the mill was opened up somewhat, and the phenolic resin, in granular form, was introduced into the working bank of elastomer, and milled in. Next, the rolls were tightened down and the stock thoroughly refined, resulting in an even mixture, but no true compound, of the ingredients. Steam was then introduced into the rolls to heat them to approximately 120° C., whereupon fusion of the stock took place within a very few minutes, resulting in a true homogeneous compound. The stock at this point was excellently plasticized and was in condition suitable for further compounding, extrusion, sheeting out, etc.

B. MOLDING

Each compound prepared as just described was molded in a steam press at 145° C. for 10 minutes to form a plaque ⅛" thick. Each such plaque was tested as follows:

C. TESTING

A strip 2" x ½" was cut from the plaque and chilled at 0° C. for one half hour. The chilled strip was then bent until the ends touched. If the strip broke, the result was recorded as a "bend break." If the strip did not break, the bent portion was struck with a hammer to crease the bent portion. If the strip shattered, the result was recorded as "hammer break"; if the strip merely tore, the result was recorded as "tear"; and if the strip remained unbroken, the result was recorded as "no break." The nature and amounts of the phenolic resins incorporated into the several compounds of this example, together with the results of the tests conducted on the cured strips, are set forth in Table I. The qualitative behavoirs of the several strips on bending were also recorded and are set forth in Table I.

EXAMPLE II

VARIATION OF PROPERTIES OF RUBBERY PRODUCTS

| | Parts |
|---|---|
| Butadiene-acrylonitrile elastomer (copolymer having 40% acrylonitrile-content, modified during polymerization) | 100 |
| Phenolic resin (acid catalyzed, hexamethylene tetramine neutralized phenol-formaldehyde resin) | 25 or 40 |
| Vinyl resin (copolymers of approximately 88.5% vinyl chloride, balance vinyl acetate) | 25, 40 or 120 |
| Sulfur | 0, 2 or 4 |
| Benzothiazyl disulfide (accelerator) | 0 or 1 |

In order to illustrate the variation of the properties of the rubbery type compositions according to this invention, in accordance with different proportions of ingredients and different curing conditions, a series of compounds was made up in accordance with the foregoing schedule.

In each case the elastomer was broken down on a cold, tight-set mill for 15 minutes. Thereafter the rolls were opened slightly, and the phenolic resin and vinyl resin (if used) were worked in in the order named. Thereafter the mill was tightened down and the stock thoroughly refined, yielding an even mixture, but no true compound, of the several ingredients. Steam was then introduced into the mill rolls to heat them to 120° C., and the milling continued, whereupon the ingredients of the stock fused together into a compatible, readily workable mass. The mill was then cooled, and the sulfur and benzothiazyl disulfide, if used, were worked in. Each compound was molded into a cured plaque exactly as described in Example I. The tensile strength, elongation at break, and heat resistance of samples taken from each plaque were determined. The heat resistance was determined by keeping a sample in an oven at 120° C. and recorded as the number of days after which the test pieces cracked upon being flexed by hand. The proportions of ingredients in the several test pieces and the conditions of curing thereof are tabulated in Table II, together with the results of the tests carrried out upon the samples.

Table II

| Item No. | Parts of added Ingredients per 100 parts of elastomer | | | | Cure | | Properties of cured specimen | | |
|---|---|---|---|---|---|---|---|---|---|
| | Phenolic Resin | Vinyl Resin | Sulfur | Accelerator | Time (Min.) | Temp. (°C.) | Tensile Strength (lbs./sq. in) | Elongation | Heat Resistance (days at 120° C.) |
| 1 | 25 | 0 | 0 | 0 | 30 | 130 | 1,812 | 490 | 8 |
| 2 | 25 | 0 | 0 | 0 | 60 | 130 | 2,341 | 353 | 8 |
| 3 | 40 | 0 | 0 | 0 | 30 | 130 | 2,921 | 370 | 4 |
| 4 | 40 | 0 | 0 | 0 | 60 | 130 | 2,771 | 453 | 5 |
| 5 | 25 | 25 | 0 | 0 | 30 | 130 | 1,900 | 323 | 5 |
| 6 | 25 | 25 | 0 | 0 | 60 | 130 | 2,050 | 335 | 4 |
| 7 | 0 | 0 | 2 | 1 | 15 | 145 | 340 | 500 | 4 |
| 8 | 25 | 0 | 2 | 1 | 15 | 145 | 1,800 | 600 | 4 |
| 9 | 25 | 25 | 2 | 1 | 15 | 145 | 2,500 | 400 | 4 |
| 10 | 25 | 40 | 2 | 1 | 15 | 145 | 3,000 | 300 | 4 |
| 11 | 25 | 40 | 2 | 1 | 15 | 145 | 3,000 | 300 | |
| 12 | 25 | 80 | 2 | 1 | 15 | 145 | 3,500 | 300 | |
| 13 | 40 | 40 | 2 | 1 | 15 | 145 | 3,500 | 300 | |
| 14 | 40 | 120 | 2 | 1 | 15 | 145 | 4,300 | 300 | |
| 15 [1] | 25 | 0 | 4 | 2 | 45 | 145 | 2,350 | 280 | |
| 16 [2] | 25 | 0 | 4 | 2 | 45 | 145 | 2,450 | 430 | |
| 17 [1] | 50 | 0 | 4 | 2 | 45 | 145 | 2,725 | 200 | |
| 18 [2] | 50 | 0 | 4 | 2 | 45 | 145 | 2,975 | 450 | |
| 19 | 25 | 25 | 2 | 1 | 5 | 150 | 1,912 | 308 | 3 |
| 20 | 25 | 25 | 2 | 1 | 10 | 150 | 2,700 | 383 | 3 |
| 21 | 25 | 25 | 2 | 1 | 20 | 150 | 2,590 | 283 | 3 |
| 22 | 25 | 25 | 2 | 1 | 40 | 150 | 2,893 | 308 | 3 |
| 23 | 25 | 25 | 2 | 1 | 60 | 150 | 2,825 | 300 | 3 |
| 24 | 25 | 0 | 2 | 1 | 20 | 135 | 1,754 | 583 | |
| 25 | 25 | 25 | 2 | 1 | 20 | 135 | 1,800 | 433 | |
| 26 | 25 | 40 | 2 | 1 | 20 | 135 | 2,911 | 400 | |
| 27 | 25 | 80 | 2 | 1 | 20 | 135 | 3,090 | 300 | |
| 28 | 40 | 80 | 2 | 1 | 20 | 135 | 3,040 | 250 | |

[1] These compounds also contained 10 parts of carbon black, 3 parts of zinc oxide and 2.5 parts of hexamethylene tetramine per 100 parts of elastomer.

[2] These compounds also contained 10 parts of carbon black and 3 parts of zinc oxide per 100 parts of elastomer.

From a comparison of items 1 to 6 in the table with the other items, it appears that the heat resistance of compounds containing no added accelerators for the elastomer have somewhat superior heat resistance to other compounds containing special accelerators. Apparently the resin acts to a considerable extent as a curing agent, since the compounds without accelerators have mechanical strengths comparable with tensile strength of other compounds containing definite curing agents. It also appears that the additions of both the phenolic resin and of the Vinylite continuously increase the tensile strength of the products under any given conditions of curing. Compare for instance items 7 to 9 with items 10 to 14 and item 2 with item 4. The elongation appears to increase slightly at low percentages of added resins (note the trend of items 7 to 14) and thereafter to fall off slightly but not drastically. More drastic curing conditions, for instance longer times and higher temperatures seem to increase the tensile strength without substantial prejudice to the elongation, see items 19 to 23. Omission of special curing agents for the phenolic resin appears to slightly improve the tensile properties, see items 15 to 18. It will thus be seen that the rubbery compositions of this invention may be adjusted in their properties to meet a large range of requirements.

EXAMPLE III

FLEXIBLE FUEL CELL FITTING COMPOSITION

| | Parts |
|---|---|
| Butadiene acrylonitrile elastomer (25% acrylonitrile-content, modified during polymerization) | 100 |
| Phenolic resin (acid catalyzed hexamethylene tetramine neutralized, phenol-formaldehyde resin) | 25 |
| Carbon black | 25 |
| Sulfur | 2 |
| Benzothiazyl disulfide | 1 |

The elastomer, phenolic resin, and carbon black were introduced into a Banbury mixer in the order named, and milled together. Thereafter, steam was turned on in the jacket of the mixer to heat the same to 125° C., and the milling continued for 15 minutes. The mill was then cooled to 75° C. and the remaining ingredients milled in. The resultant compound was molded in a compression mold to form a flanged fuel-line fitting for fuel cells, and cured for 30 minutes at 150° C. The fitting was built into a composition fuel cell, and adhered well both to the fuel cell and to the metallic fuel line. The fitting was highly flexible and resistant to aviation gasoline.

EXAMPLE IV

FABRIC COATING

| | Parts |
|---|---|
| Phenolic resin (ammonia catalysed, 82% phenol content) | 25 |
| Vinyl resin (copolymer of approximately 88.5% vinyl chloride, balance vinyl acetate) | 40 |
| Butadiene acrylonitrile elastomer (45% acrylonitrile, modified) | 100 |

The above ingredients were compounded substantially as were the corresponding ingredients of Example III. The resultant compound was hot-calendered onto a 10-ounce cotton duck fabric, forming a tough, flexible, tacky, adherent coating thereon. The fabric was then heated in an oven at 140° C. for one half hour, yielding a cured water-and-gas-proof sheeting which was a suitable material for inflatable flotation gear and for waterproof apparel. The product may also be laminated as described in the next example.

EXAMPLE V

LAMINATED PRODUCTS

| | Parts |
|---|---|
| Butadiene-acrylonitrile elastomer | 100 |
| Phenolic resin (ammonia catalysed condensate of 80% phenol and 20% formaldehyde) | 25 |
| Benzene | 250 |
| Methyl ethyl ketone | 350 |

The elastomer was broken down on a cold mill for 5 minutes. Thereafter the phenolic resin was added and thoroughly worked in. The mass was then removed from the mill and dissolved with high speed agitation in the mixed benzene and methyl ethyl ketone, yielding a smooth, even flowing cement. Six-ounce cotton duck was impregnated with this cement and dried in a hot air oven for 10 minutes at 100° C. The dried impregnated fabric was plied into a laminate of five layers and pressed between plates engraved with a leather-like pattern under a pressure of 250 pounds per square inch and at a temperature of 145° C. for 20 minutes. The resultant product was an excellent panel having a leather-like appearance suitable for the manufacture of luggage and the like.

EXAMPLE VI

MOLDING COMPOUND

| | Parts |
|---|---|
| Butadiene-acrylonitrile elastomer | 100 |
| Phenolic resin (acid catalyzed, hexamethylene tetramine neutralized phenol-formaldehyde resin) | 600 |

The elastomer was broken down on a roll mill, and the phenolic resin incorporated in small portions. Thereafter, the mill was heated to 120° C., resulting in a homogeneous compound. The compound was removed from the mill, cooled, and ground in a rod mill. The resultant comminuted product was workable in the conventional ways as a thermosetting molding powder. Objects molded from this powder with a wood flour filler were characterized by high strength and shock resistance.

EXAMPLE VII

PRODUCTION OF CEMENT FROM FRESH ELASTOMER

| | Parts |
|---|---|
| Butadiene acrylonitrile elastomer latex (modified, 45% acrylonitrile content, 25% solids) | 400 |
| Phenolic resin (acid catalyzed, hexamethylene tetramine neutralized phenol-formaldehyde resin) | 25 |

The elastomer latex was coagulated by the addition of a small quantity of alum and the curd removed, pressed to remove as much as possible of the water and treated with a sufficient quantity of a mixed solvent containing 25% benzene and 75% methyl ethyl ketone to dissolve the same despite the presence of the entrapped water. The phenolic resin was then incorporated into the solution by means of a high speed mixer, yielding a smooth stable cement which was suitable as an adhesive and as an impregnating agent.

EXAMPLE VIII

COLD RESISTANT COMPOUND

| | Parts |
|---|---|
| Butadiene acrylonitrile elastomer latex | 400 |
| Phenolic resin (acid catalyzed, hexamethylene tetramine neutralized phenol-formaldehyde resin) | 25 |

The latex was coagulated by the use of minimal quantities of alum. The curd was removed from the serum, pressed to remove the entrapped water as far as possible, placed on a roll mill and broken down for 5 minutes. During the breaking down a large proportion of the water was extruded. The phenolic resin was then added to the working bank and became smoothly incorporated therein to form a true compound, despite the fact that no supplementary heat was employed. The resultant compound was cured at 140° C. for 15 minutes, yielding a product having outstanding cold resistance.

EXAMPLE IX

EXPANDED PRODUCT

| | Parts |
|---|---|
| Butadiene-acrylonitrile elastomer (40% acrylonitrile content, modified) | 100 |
| Phenolic resin (acid catalyzed, hexamethylene tetramine neutralized phenol-formaldehyde resin) | 20 |
| Ammonium carbonate | 20 |

The elastomer was broken down on a cold roll mill, and the phenolic resin worked in. The mill was then briefly heated to 120° C., whereupon the mass converted to a homogeneous compound. The mass was again cooled down to slightly above room temperature, and the ammonium carbonate milled in. The resultant compound was cured in an oven at 200° C. for 10 minutes, yielding an expanded product, the pores of which were largely intercommunicating. The expanded product was soft, resilient and absorptive of liquids.

From the foregoing general discussion and specific examples it is evident that this invention provides products from the elastomeric copolymers of conjugated diolefins with the acrylonitriles and from the phenolic resins, which are far superior in workability, plasticity and general properties, to the several constituents thereof. Moreover, the compounds in the range intermediate between the predominately-elastomeric and predominately-phenolic-resin compositions are flexible but stiff products having unique properties and uses. The products may be used for fuel cell panels, luggage panels, chemical-and-solvent-resistant linings for tanks, gasket materials, control-lever boots, etc. Fabrics impregnated or coated with the compositions of this invention may be used in weather-proof apparel, flotation gear, lighter-than-air craft, gaskets, container closure seals and the like; also the impregnated and coated materials may be plied up and laminated to form panels and fabricated articles. The predominantly elastomeric compositions are admirably flexibilized rubbers suitable for the manufacture of shoe soles, flexible tubings and fittings, etc.

The following is believed to be specifically novel and is desired to be secured by Letters Patent:

We claim:

1. Process which comprises coagulating, from the latex in which it was polymerized, an elastomeric copolymer of a compound having the formula

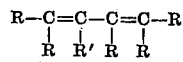

with from 10% to 75%, based on the total weight of copolymerized compounds, of a compound having the formula

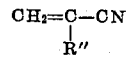

in which formulae R, independently in each occurrence, represents a substituent selected from the group consisting of hydrogen and the methyl radical, R' represents a substituent selected from the group consisting of hydrogen and methyl and chloro radicals, and R'' represents a substituent selected from the group consisting of hydrogen and methyl, ethyl, propyl and chloro radicals, and thereafter directly, without subjection to heat-drying, milling the resultant wet curd with an uncured thermosetting resinous condensate of an aldehyde with a compound selected from the group consisting of phenol, the cresols and mixtures of phenol with a cresol, to yield a homogeneous compound, said resinous condensate being employed to the extent of from 10% to 900%, based on the weight of elastomeric copolymer.

2. Process which comprises coagulating, from the latex in which it was polymerized, an elastomeric copolymer of butadiene with from 10% to 75%, based on the weight of copolymerized compounds, of acrylonitrile, and thereafter directly, without subjection to heat-drying, milling the resultant wet curd with an uncured thermosetting resinous condensate of an aldehyde with a compound selected from the group consisting of phenol, the cresols and mixtures of phenol with a cresol, to yield a homogeneous compound, said resinous condensate being employed to the extent of from 10% to 900%, based on the weight of elastomeric copolymer.

FRANK J. GROTEN.
ROBERT J. REID.

REFERENCES CITED

The following references are of record in the file of this patent:

UNITED STATES PATENTS

| Number | Name | Date |
|---|---|---|
| 1,200,692 | Baekeland | Oct. 10, 1916 |
| 2,229,880 | Allison | Jan. 28, 1941 |
| 2,270,959 | Murke | Jan. 27, 1942 |
| 2,277,941 | Almy | Mar. 31, 1942 |
| 2,325,981 | Sarbach | Aug. 3, 1942 |
| 2,334,526 | Allison | Nov. 16, 1943 |
| 2,341,115 | Novotny | Feb. 8, 1944 |
| 2,376,854 | Saunders | May 22, 1945 |
| 2,394,783 | Keller et al. | Feb. 12, 1946 |
| 2,405,038 | Jennings | July 30, 1946 |

FOREIGN PATENTS

| Number | Country | Date |
|---|---|---|
| 497,137 | Great Britain | Dec. 13, 1938 |
| 511,368 | Great Britain | Aug. 17, 1939 |
| 48,977 | France Addition to 804,552 | |

OTHER REFERENCES

Ser. No. 357,662, Wildschut (A. P. C.), published April 20, 1943.

1944 Plastics Catalog, page 111, pub., 1943, by Plastics Catalogue Corp., N. Y.

Wildschut, pp. 86–99, Rubber Chemistry and Technology, Jan. 1946 (reprint of article originally published in 1942).